(12) United States Patent
Jaworowski et al.

(10) Patent No.: US 10,821,521 B2
(45) Date of Patent: Nov. 3, 2020

(54) ARTICLE SURFACE FINISHING METHOD

(71) Applicant: Hamilton Sundstrand Corporation, Charlotte, NC (US)

(72) Inventors: Mark R. Jaworowski, Glastonbury, CT (US); Sergey Mironets, Charlotte, NC (US); Gary M. Lomasney, Glastonbury, CT (US); Weilong Zhang, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 725 days.

(21) Appl. No.: 15/485,048

(22) Filed: Apr. 11, 2017

(65) Prior Publication Data

US 2018/0290212 A1 Oct. 11, 2018

(51) Int. Cl.
*B22F 3/24* (2006.01)
*B33Y 10/00* (2015.01)
*B33Y 40/00* (2020.01)
*F28F 3/02* (2006.01)
*C25F 7/00* (2006.01)
(Continued)

(52) U.S. Cl.
CPC .............. *B22F 3/24* (2013.01); *B22F 3/1055* (2013.01); *B23K 15/0086* (2013.01); *B23K 26/0093* (2013.01); *B23K 26/342* (2015.10); *B33Y 10/00* (2014.12); *B33Y 40/00* (2014.12); *C25F 3/16* (2013.01); *C25F 3/20* (2013.01); *C25F 3/22* (2013.01); *C25F 3/24* (2013.01); *C25F 7/00* (2013.01); *F28D 9/0062* (2013.01); *F28F 3/025* (2013.01); *B22F 5/10* (2013.01); *B22F 2003/247* (2013.01); *B22F 2999/00* (2013.01); *B23K 2101/14* (2018.08); *F28F 2255/18* (2013.01);
(Continued)

(58) Field of Classification Search
CPC .... B22F 3/24; B22F 2003/247; B22F 3/1055; B22F 5/10; B22F 2999/00; C25F 3/16; C25F 3/22; C25F 3/24; C25F 3/20; C25F 7/00; B23K 15/0086; B23K 26/342; B23K 26/0093; B23K 2101/14; F28D 9/0062; Y02P 10/295; F28F 2255/18; F28F 2275/064; F28F 3/025; B33Y 10/00; B33Y 40/00
See application file for complete search history.

(56) References Cited

U.S. PATENT DOCUMENTS

| 3,420,759 A | 1/1969 | Inoue | |
| 2005/0155868 A1* | 7/2005 | Kobata | B23H 5/08 205/652 |

(Continued)

FOREIGN PATENT DOCUMENTS

WO 2016193736 A1 12/2016

OTHER PUBLICATIONS

European Search Report from the European Patent Office for EP Application No. 18166826.0 dated Sep. 5, 2018, 7 pages.

*Primary Examiner* — Jessee R Roe
*Assistant Examiner* — Rebecca Janssen
(74) *Attorney, Agent, or Firm* — Cantor Colburn LLP (57) ABSTRACT

Manufacturing methods are disclosed that can electropolish a metal surface by disposing an electrode over the metal surface, and a permeable dielectric spacer between the metal surface and the electrode. An electrolyte is infiltrated into the permeable dielectric spacer, and an electrical voltage differential is applied to the electrode and the metal surface.

20 Claims, 4 Drawing Sheets (51) Int. Cl.
*C25F 3/16* (2006.01)
*B22F 5/10* (2006.01)
*B23K 15/00* (2006.01)
*B23K 26/342* (2014.01)
*B23K 26/00* (2014.01)
*F28D 9/00* (2006.01)
*C25F 3/24* (2006.01)
*C25F 3/20* (2006.01)
*B22F 3/105* (2006.01)
*C25F 3/22* (2006.01)
*B23K 101/14* (2006.01)

(52) U.S. Cl.
CPC ....... *F28F 2275/064* (2013.01); *Y02P 10/295* (2015.11)

(56) References Cited

U.S. PATENT DOCUMENTS

| | | |
|---|---|---|
| 2014/0360698 A1 | 12/2014 | Waldman et al. |
| 2015/0001093 A1* | 1/2015 | Carter .................... B23H 9/14 205/640 |
| 2016/0161195 A1 | 6/2016 | Meng et al. |

\* cited by examiner

FIG. 4E

ARTICLE SURFACE FINISHING METHOD

BACKGROUND

The described subject matter relates generally to the field of surface finishing, and in particular to the manufacture of heat exchangers and to additive manufacturing of articles with finished surfaces.

Additive manufacturing refers to a category of manufacturing methods characterized by the fact that the finished part is created by layer-wise construction of a plurality of thin sheets of material. Additive manufacturing may involve applying liquid or powder material to a workstage, then doing some combination of sintering, curing, melting, and/or cutting to create a layer. The process is repeated up to several thousand times to construct the desired finished component or article.

Various types of additive manufacturing are known. Examples include stereo lithography (additively manufacturing objects from layers of a cured photosensitive liquid), electron beam melting (using a powder as feedstock and selectively melting the powder using an electron beam), laser additive manufacturing (using a powder as a feedstock and selectively melting the powder using a laser), and laser object manufacturing (applying thin solid sheets of material over a workstage and using a laser to cut away unwanted portions).

Many additive manufacturing processes utilize a scanning energy beam to fuse a fusible material. Scanning is commonly implemented in a raster scanning mode where a plurality of substantially parallel scan lines are used to form the article. In order to reduce deformation of the layers from thermal or chemical reaction kinetics effects, each layer is often scanned in discrete sections at separate locations along the layer. Seams are thus formed at boundaries between adjacent sections. Scanning section seams, as well as other artifacts of powder fusion or other additive manufacturing processing can contribute to undesirable surface characteristics of components formed by additive manufacturing.

BRIEF DESCRIPTION

According to some embodiments, a method for making an article comprises inputting a digital model of the article into an additive manufacturing apparatus or system comprising an energy source. The additive manufacturing apparatus applies energy from the energy source to successively applied incremental quantities of a metal powder, which fuses the powder to form incremental portions of the metal powder according to the digital model to form the article. An electrode is disposed over a fused metal surface of the article, and a permeable dielectric spacer is disposed between the fused metal surface and the electrode. An electrolyte is infiltrated into the permeable dielectric spacer, and an electrical voltage differential is applied to the electrode and the fused metal surface.

According to some embodiments, a method of making a heat exchanger comprises forming a heat exchanger core that includes a plurality of internal fluid flow passages. An electrode is disposed over an internal metal surface of the internal fluid flow passages, and a permeable dielectric spacer is disposed between the internal metal surface and the electrode. An electrolyte is infiltrated into the permeable dielectric spacer, and an electrical voltage differential is applied to the electrode and the internal metal surface. The electrode and the permeable dielectric spacer are then removed from the internal metal surface.

According to some embodiments, a method of electropolishing a metal surface comprises disposing an electrode over the metal surface, and a permeable dielectric spacer between the metal surface and the electrode. An electrolyte is infiltrated into the permeable dielectric spacer, and an electrical voltage differential is applied to the electrode and the metal surface to electropolish the metal surface.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
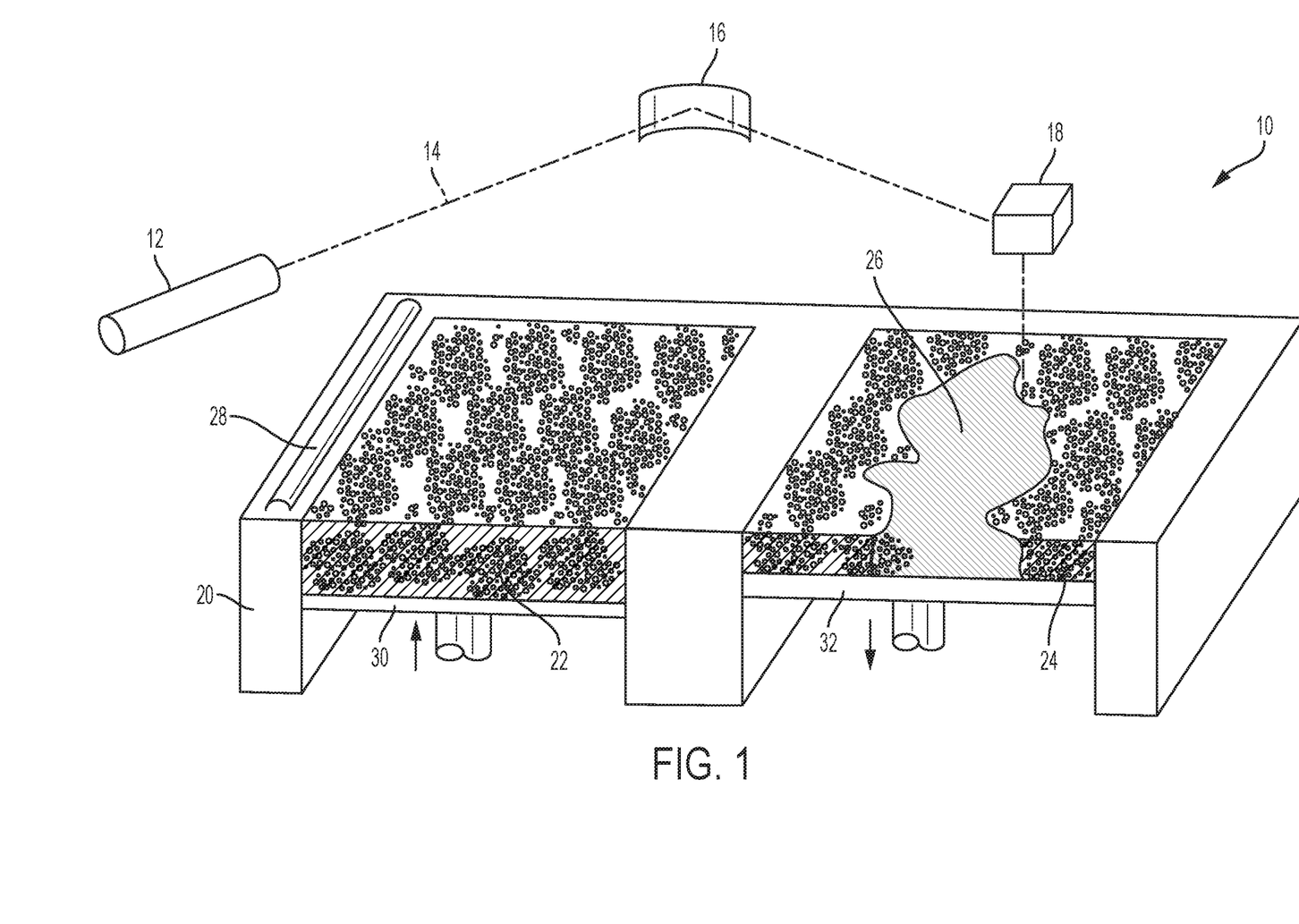
FIG. 1 is a schematic depiction of an apparatus for making articles using metal powder fusion additive manufacturing.

Referring now to the Figures, FIG. 1 depicts an example embodiment of an additive manufacturing apparatus and process. As shown in FIG. 1, an example of an additive manufacturing system or apparatus 10 includes energy source 12 that generates an energy beam 14, a first wave guide or other optical guide 16 that is used to guide the energy beam, a second wave guide or optical guide 18, a frame 20, a powder supply 22, a powder processing bed 24, sintered powder material 26, a spreader 28, a powder supply support 30, and a stack support 32. Of course, the illustration in FIG. 1 is schematic in nature, and many alternative designs of additive manufacturing devices are possible. Various types of additive manufacturing materials, energy sources, powder feed and storage, atmosphere control, and processes can be used to fabricate the heat exchanger and the individual features thereof that are described herein. The type of additive manufacturing process used depends in part on the type of material out of which it is desired to manufacture the component. In some embodiments, the heat exchanger is made of metal, and a metal-forming additive manufacturing process can be used. Such processes can include selective laser sintering (SLS), powder bed laser fusion (PBLF), or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies. FIG. 1 merely illustrates one potential additive manufacturing system for creating an additively manufactured article.

Energy source 12 can be any source capable of creating focused energy. For example, energy source 12 can be a laser or an electron beam generator. Energy source 12 generates an energy beam 14, which is a beam of focused or focusable energy, such as a laser beam or an electron beam. Optical guide 16 such as a mirror is present in some embodiments to deflect radiation in a desired direction. A second optical guide 18, such as an optical head is present in some embodiments, and also directs energy in a desired direction. For example, optical guide 18 can include a mirror and be attached to an x-y positioning device. Frame 20 is used to contain powder material in powder supply 22 and in powder processing bed 24. Powder supply 22 and powder processing bed 24 include powder material, such as or powdered metals. Powder processing bed 24 further includes fused powder 26. Fused powder 26 is powder contained within powder processing bed 24 that has been at least partially sintered or melted. Spreader 28 is a spreading device such as an air knife using an inert gas instead of air, which can transfer powder material from powder supply 22 to powder processing bed 24. The depiction of spreader 28 in FIG. 1 is of course only schematic in nature, and does not depict specific features such as controllably directed air jet nozzles that could be used to remove metal powder from targeted portions of the assembly including internal cavities such as fluid flow passages in a heat exchanger core. Powder supply support 30 and stack support 32 are used to raise and/or lower material thereon during additive manufacturing.

During operation, energy source 12 generates energy beam 14, which is directed by the optical guides 16 and 18 to the powder processing bed 24. The energy intensity and scanning rate and pattern of the energy beam 14 can be controlled to produce a desired result in the powder processing bed. In some aspects, the result can be partial melting of powder particles resulting in a fused structure after solidification such as a sintered powder metal structure having some degree of porosity derived from the gap spaces between fused powder particles. In some aspects, the result from exposure to the energy beam 14 can be complete localized melting and fluidization of the powder particles producing a metal article having a density approaching or equal to that of a cast metal article. In some aspects, the energy beam provides homogeneous melting such that an examination of the manufactured articles can detect no particle pattern from the original particles. After each layer of the additively manufactured article is completed, powder supply support 30 is moved to raise the height of powder material supply 22 with respect to frame. Similarly, stack support 32 is moved to lower the height of article with respect to frame 20. Spreader 28 transfers a layer of powder from powder supply 22 to powder processing bed 24. By repeating the process several times, an object may be constructed layer by layer. Components manufactured in this manner may be made as a single, solid component, and are generally stronger if they contain a smaller percentage of oxygen, hydrogen, or carbonaceous gases. In some embodiments, the quantity of impurities of, for example, oxygen, is reduced to less than 50 ppm, or even less than 20 ppm.

The digital models used in the practice of the disclosure are well-known in the art, and do not require further detailed description here. The digital model can be generated from various types of computer aided design (CAD) software, and various formats are known, including but not limited to STL (standard tessellation language) files, AMF (additive manufacturing format) files, PLY files, wavefront (.obj) files, and others that can be open source or proprietary file formats.

Figure 2:
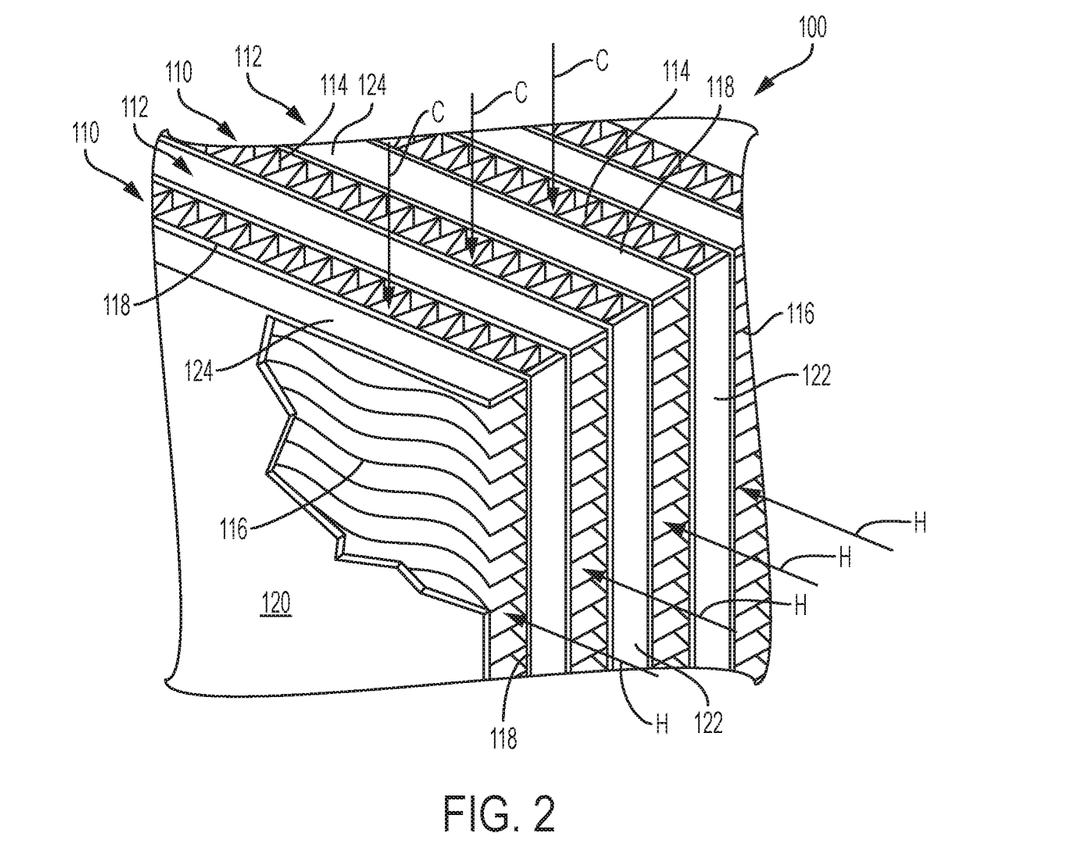
FIG. 2 is a schematic depiction of a heat exchanger that can be manufactured as described herein.

Manufacture of articles through powder fusion additive manufacturing can result in surfaces that are relatively rough compared to some other more conventional manufacturing techniques. Additionally, one of the beneficial features of additive manufacturing is the capability to fabricate articles with internal features such as internal cavities or passages that are not readily manufacturable by conventional fabricating techniques and that are not readily accessed to smooth, hone, or otherwise finish internal surfaces. One non-limiting example embodiment of an application where smooth internal surfaces can be beneficial is for heat exchangers where smooth internal surfaces can promote efficient fluid flow and heat transfer. An example embodiment of a heat exchanger core 100 is schematically depicted in FIG. 2. The heat exchanger assembly 100 can be fabricated using additive manufacturing techniques such as powder bed fusion as described with respect to FIG. 1, or using any conventional known fabrication technique. Some conventional fabrication techniques, including but not limited to brazing and welding, can leave artifacts such as bumps, ridges, gaps, or recessions that can adversely impact fluid flow and that can be addressed by surface finishing. As shown in FIG. 2, a portion of a heater core 100 is shown in an isometric view with a cut-away along the front face (end sheet 120) to illustrate the inside of the assembly. As shown in FIG. 2, the heat exchanger core 100 includes a heat absorption side (cold side) fluid flow path 110 through the fin structures 114 and a heat rejection side (hot side) fluid flow path 112 through the fin structures 112. The cold and hot side fluid flow paths 110 and 112 are separated by parting sheets 118. Parting sheets 118 are also formed from metal alloys and act to support the fin structures 114 and 116. End sheets 120 form the outside barriers of primary hot heat exchanger 100. Closure bars 122 and 124 form the outside barriers of cold and hot fluid flow paths 110 and 112, respectively. Additional structural elements (not shown) include, but are not limited to core bands that act to support the overall stack of hot and cold fin structures of heat exchanger 100, mounting structures, or fluid flow guide elements. The heat exchanger core 100 is typically disposed inside a housing (not shown) that supports and protects the core and provides fluid flow guides (e.g., manifolds, not shown) into and out of the cold and hot side fluid flow paths 110, 112. In some embodiments, the heat exchanger can be configured for use on an aircraft. During operation, cold air from a cold air source (not shown, e.g., ram air or fan-assisted ram or other intake air on an aircraft) enters the cold side fluid flow path 110 in the direction indicated by the arrows C. Hot air from a hot air source (not shown, e.g., bleed air from a turbocompressor engine or ECS process air on an aircraft) enters the hot side fluid flow path 112 in the direction of arrows H and rejects heat through the fin structures 114, 116 and across the parting sheets 118 to the cold side fluid flow path 110. The metal components of heat exchanger 100 may be any metal known in the art of heat exchanger design. In some embodiments, the metal components can be aluminum alloys for low temperature heat exchangers and Ni based alloys for high temperature heat exchangers.

As mentioned above, the powder used in the methods described herein comprises a metal powder. Various metals can be used, depending on the material and properties requirements for the application of the finished product. Various ferrous steel alloys can be used, including stainless and non-stainless steels, with optional inclusion of various alloying elements such as chromium or nickel for properties such as high-temperature performance. Other alloys such as aluminum alloys and titanium can be used as well. Metal powders can be formed using a gas atomized process. Examples of particle sizes for the metal powders can range from 5 μm to 150 μm. In some aspects, the alloy elements can be combined together before forming a powder having a homogeneous composition. In some aspects, one or more of the individual alloy elements can have its own powder particles that are mixed with particles of other elements in the alloy mixture, with formation of the actual alloy to occur during the fusion step of the additive manufacturing process. In some aspects, the powder is "neat", i.e., it includes only particles of the alloy or alloy elements. In other aspects, the powder can include other components such as polymer powder particles. In selective sintering, polymer particles can help to temporarily bind metal powder particles together during processing, to be later removed by pyrolysis caused by the energy source or post-fabrication thermal processing.

With reference now to FIGS. 3 and 4, example embodiments are disclosed by reference to schematic depictions of a metal workpiece (e.g., a heat exchanger exchanger core) or portion(s) thereof. Each of the embodiments described in FIGS. 3-4 begins with a metal surface 202 shown in FIGS. 3A and 4A. In some embodiments, the metal surface 202 can be a fused metal surface produced by an additive manufacturing method such as powder bed fusion described with respect to FIG. 1. In some embodiments, the metal surface 202 can be an internal metal surface of a fluid flow passage of a heat exchanger core as described in FIG. 2. In some embodiments, the metal surface 202 can be an internal surface of any metal object (e.g., a chamber, cavity, conduit or other passageway). In some embodiments, the metal surface 202 can include a surface dimension (e.g., a channel width or depth) of less than 100 μm, or less than 50 μm, or less than 20 μm. The methods described herein can be used on any other metal surface that is receptive to electropolishing.

Figure 3A:
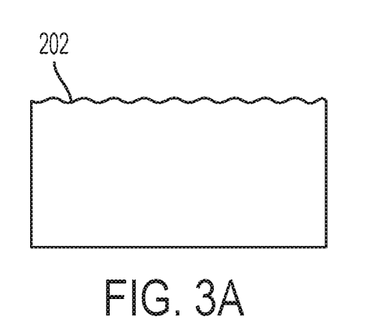
FIGS. 3A, 3B, 3C, 3D, 3E, and 3F each shows a schematic metal cross-section view of a metal surface at a different stage of an example embodiment of a method described herein.
Figure 3B:
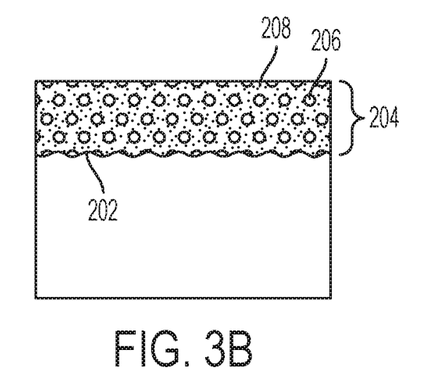
Figure 3C:
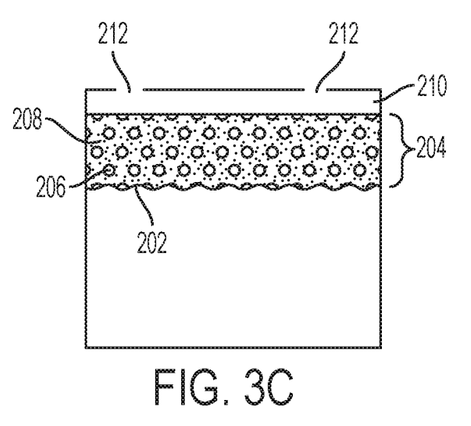
Figure 3D:
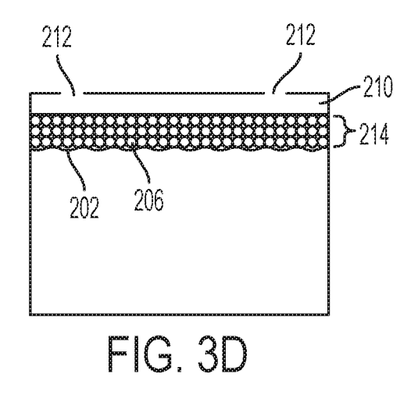

With reference now to FIG. 3, in FIG. 3B a layer 204 comprising dielectric particles 206 and a removable binder 208 has been applied to the metal surface 202. The dielectric particles can comprise any dielectric material such as glass, ceramic, polymers, or composite materials comprising any of these materials. Particle sizes can provide a mean particle diameter in a range with a low end of 5 μm, 10 μm, or 15 μm, and a high end of 40 μm, 45 μm, or 50 μm. These endpoints can be independently combined, and ranges with all possible combinations of the above lower and upper endpoints are hereby explicitly disclosed. The removable binder can comprise a wide variety of polymers and coating compositions. One factor in the choice of polymer can be its removability from the metal substrate. Volatile polar organic solvents can used to remove many types of coatings, but can also entail significant effort and expense to avoid environmental contamination and recover the solvents after use. Coatings can also be removed by heating the coating to a fluid state so that it can be removed with a moving fluid such as air, water or an organic solvent. In some embodiments, the polymer(s) can be water-soluble (e.g., polyethylene glycol, methoxypolyethylene glycol, polyvinyl alcohol, carboxy methyl cellulose,polyvinyl pyrrolidone, polyacrylic acid, apolyacrylamide, xantham gum, pectins, chitosan derivative, dextran, carrageenan, guar gum, cellulose ethers, or starch based compounds) to facilitate removal with water. In some embodiments, water-soluble polyalkylene oxides (e.g., polyethylene glycol, methoxypolyethylene glycol), which can have both water-solubility and low melting points, can facilitate removal with hot water. The layer 204 can be applied using various coating techniques, including dip coating, spray coating, etc., and can contain various materials and additives known in the art for coatings. In FIG. 3C, a layer of a conductive electrode 210 is applied on top of the layer 204. The layer of conductive electrode 210 should have sufficient structural integrity to maintain cohesion after the removable binder 208 is removed and the conductive electrode 210 is supported by the remaining dielectric particles 206 (FIG. 3D), but can have optional openings such as openings 212 to facilitate removal of the removable binder 208. The conductive electrode 210 can be applied using various techniques such as dipping, spraying, injecting, electroplating, electroless plating, deposition of pyrolytic carbon, or chemical vapor deposition,. The layer can be also be applied using electrophoresis by applying an electrical charge onto the metal surface 202 so as to deposit a metal or metal precursor onto the layer 204, followed by conversion of any precursor to a metal. The electrophoresis technique can be used even if the surface is not readily accessible to application devices such as nozzles. In some embodiments, a composition comprising metal or other conductor (e.g., conductive carbon) and a polymer binder can be deposited on top of the layer 204 using electrophoresis, spray or any other application technique and fused, cured or coalesced into a cohesive electrode 210. The removable binder 208 can be removed by flowing a solvent (e.g., hot water for polyethylene glycol) in and out of the layer 204 through the openings 212 in the conductive electrode 210. FIG. 3D schematically shows the conductive electrode over a permeable separator 214 comprising the dielectric particles 206 from the layer 204 with the removable binder 208 removed. As shown in FIG. 3D, some of the dielectric particles 206 may be repositioned in response to removal of the removable binder 208.

Figure 4A:
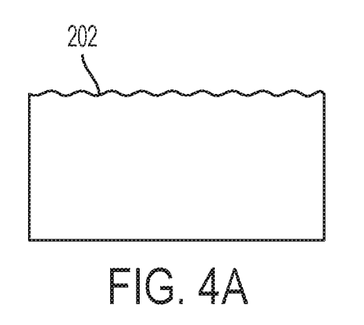
FIGS. 4A, 4B, 4C, 4D, and 4E each shows a schematic metal cross-section view of a metal surface at a different stage of an example embodiment of a method described herein.
Figure 4B:
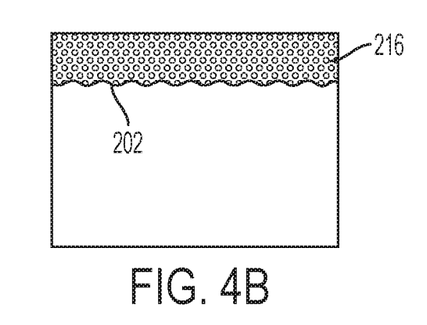
Figure 4C:
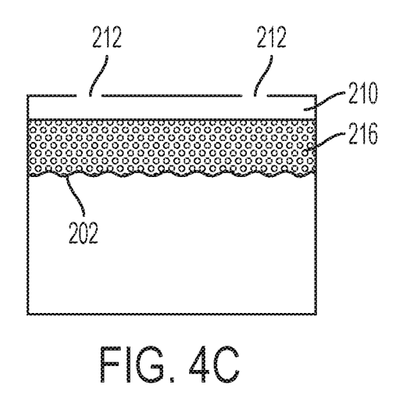

With reference now to FIG. 4, which uses numbering from FIG. 3 to denote common features to FIGS. 3 and 4, a porous or otherwise permeable electrically non-conductive material is directly applied or formed as a permeable dielectric separator 216 on the metal surface 202, which can form a contiguous porous dielectric material as shown in FIG. 4B. Examples of materials for the permeable separator 216 include porous ceramics such as silica gel, microporous zeolites, aluminum oxide, silicon carbide or zirconium oxide, which can be deposited or formed on the metal surface 202 by sol gel, chelate, metal-organic decomposition, or Pechini processing. Organic polymer foams (e.g., expanded polyurethane or polystyrene) can also be used as the permeable dielectric separator. Organic polymers can have a lower dielectric constant than some of the inorganic materials, but this difference can be mitigated by the contribution of void space in the foam. In FIG. 4C, the layer of conductive electrode 210 has been applied over the layer of permeable separator 216, using similar techniques as described above with respect to FIG. 3C. In some embodiments, permeable separator 216 such as a contiguous porous dielectric material can provide structural support for the subsequently applied electrode 210, in which case the electrode 210 need not be self-supporting so that inks and other printing techniques can be used to apply the electrode 210 to the permeable separator 216.

With reference now to FIGS. 3 and 4, the permeable separator 214/216 can be infiltrated with a liquid electrolyte, and an electrical voltage differential applied to the electrode 210 and the metal surface 202. FIGS. 3E and 4D schematically show the results of the electropolishing with finished metal surface 202'. The liquid electrolyte can be an aqueous liquid electrolyte, a non-aqueous organic liquid electrolyte, or an ionic liquid electrolyte. Aqueous liquid electrolytes include mixed acid solutions, such as sulfuric and phosphoric acid. Non aqueous organic liquids include alcohol, glycol, or organic acid-based solutions with the addition of perchloric acid or an inorganic chloride salt. Examples of ionic liquids include the choline chloride/urea eutectic. The composition and specific properties of the liquid electrolyte can depend on the composition of the metal surface 202 and the electrode 210, the distance between the electrode 210 and the metal surface 210, and the target surface properties of the finished metal surface 202'. In some embodiments, the thickness of the permeable separator 214/216 can provide a distance between the electrode 210 and the metal surface 210 in a range with a low end of 1 µm, 10 µm, or 25 µm, and a high end of 50 µm, 100 µm, or 200 µm. These endpoints can be independently combined, and ranges with all possible combinations of the above lower and upper endpoints are hereby explicitly disclosed. In some embodiments, electrolyte resistance can be relatively higher for electropolishing applications compared to other electrolytic processes. In some embodiments, the electrolyte can have a resistivity in a range with a low end of 1 ohm-cm, 10 ohm-cm, or 100 ohm-cm, and a high end of 100 ohm-cm, 1000 ohm-cm, or 10,000 ohm-cm. These endpoints can be independently combined, and ranges with all possible combinations (excluding impossible combinations where the high end is not greater than the low end) of the above lower and upper endpoints are hereby explicitly disclosed.

Figure 3E:
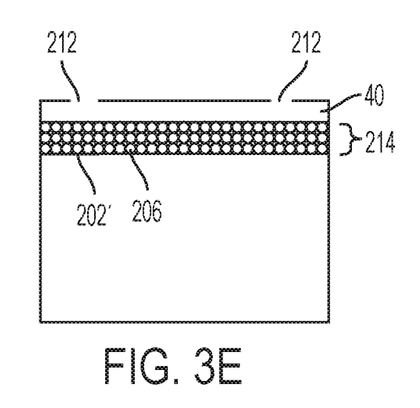
Figure 4D:
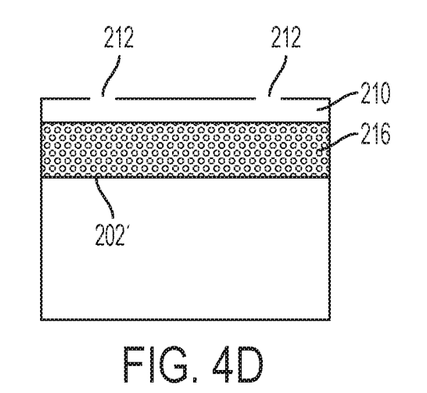

With the electrolyte disposed in the permeable separator 214/216, an electrical circuit through the electrolyte can be completed through electrical contacts (not shown) connected to a power source and to the electrode 210 and the metal surface 202. In some embodiments, the voltage differential can be in a range with a low end of 2 volts, 5 volts, or 20 volts, and a high end of 25 volts, 50 volts, or 100 volts. These endpoints can be independently combined, and ranges with all possible combinations of the above lower and upper endpoints are hereby explicitly disclosed. In some embodiments, the current density can be in a range with a low end of 0.1 amp/cm$^2$, 1 amp/cm$^2$, or 10 amp/cm$^2$, and a high end of 10 amp/cm$^2$, 100 amp/cm$^2$, or 1000 amp/cm$^2$. These endpoints can be independently combined, and ranges with all possible combinations (excluding impossible combinations where the high end is not greater than the low end) of the above lower and upper endpoints are hereby explicitly disclosed. Duration of the electropolishing can be in a range with a low end of 10 seconds, 30 seconds, 60 seconds, or 1200 seconds. These endpoints can be independently combined, and ranges with all possible combinations (excluding impossible combinations where the high end is not greater than the low end) of the above lower and upper endpoints are hereby explicitly disclosed.

In some embodiments, the application of the voltage differential operation can cause evolution of gases such as hydrogen and oxygen. In embodiments such as heat exchangers or other articles with internal cavities or passages, removal of such evolved gas can be promoted by flowing the liquid electrolyte or another fluid through the internal cavities or passages. In some embodiments, removal of evolved gas can be promoted by varying a flow rate of flowing liquid electrolyte through the internal fluid flow passages, or varying the applied electrical voltage or current, or simultaneously varying both the flow rate of flowing liquid electrolyte. In some embodiments, such variations can include pulsation with periods of no flow rate or electrical voltage interspersed with periods of constant or varying flow rate or electrical voltage.

Figure 3F:
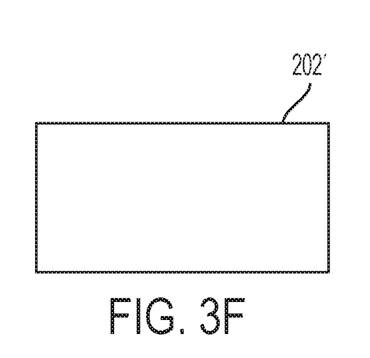
Figure 4E:
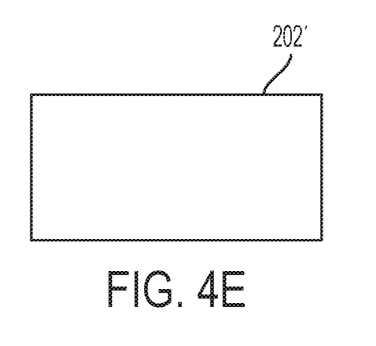

After electropolishing, in some embodiments the electrode 210 and the permeable dielectric layer 214/216 can be removed to expose the metal surface 202 as shown in FIGS. 3F and 4E. A dedicated removal step is not necessarily required, however, as the targeted use of the article could result in removal of the electrode 210 and permeable dielectric layer 214/216 to expose the metal surface 202. In some embodiments, removal of the permeable dielectric layer 214 and electrode 210 in FIG. 3 can be accomplished by degrading the electrode 210 (e.g., with acid, solvent, thermally, electrolytically, ultrasonically, or a combination thereof, taking into account the material composition and properties of the electrode) and flushing the surface with a fluid such as air, water, or organic solvent to remove the degraded electrode 210 and the dielectric particles 206. Removal of the permeable dielectric layer 216 and electrode 210 in FIG. 4 can be accomplished with similar techniques modified to also provide for degradation of the permeable dielectric layer 216.

In some embodiments, the permeable dielectric spacers and electrodes described herein can be disposed onto a metal surface at intermediate steps during fabrication of an article, or as an end step of the fabrication process. This provides various technical effects allowing for efficient fabrication techniques. In either of the intermediate step or end step embodiments, integration of the permeable dielectric spacer and electrode into a unitary structure with the metal surface allows for articles with complex structures, including but not limited to internal surfaces such as with cavities, channels or conduits, to be electropolished in a single stage. Such single-stage electropolishing can be contrasted with conventional electropolishing of internal surfaces such as internal flow passages such as the heater core 100 (FIG. 2), which would require separate stages to be separately applied to each parting sheet-defined course of the heat exchangers. In the case of additive manufacturing, such conventional electropolishing stages would necessitate multiple removals of the workpiece from the additive manufacturing apparatus, set-up in an electropolishing apparatus and performance of the electropolishing stage, and return to the additive manufacturing apparatus for further application. In some embodiments, further efficiencies can be achieved by introduction of the permeable dielectric spacer and electrode in single steps such as at the conclusion of the fabrication process. In some embodiments, a technical effect can be provided in which a close-proximity electrode can promote electropolishing of fine or small-dimensioned features of a metal surface.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method for making an article, comprising
   inputting a digital model of the article into an additive manufacturing apparatus or system comprising an energy source;
   forming the article by repeatedly applying energy from the energy source to fuse successively applied incremental quantities of a metal powder corresponding to the digital model of the article;

disposing an electrode over a fused metal surface of the article, and a permeable dielectric spacer between the fused metal surface and the electrode;

infiltrating a liquid electrolyte into the permeable dielectric spacer; and applying an electrical voltage differential to the electrode and the fused metal surface, and wherein disposing the electrode and permeable dielectric spacer comprises:

applying a layer comprising dielectric particles and a removable binder on the fused metal surface;

applying the electrode over the layer; and removing the removable binder.

2. The method of claim 1, wherein removing the removable binder comprises a exposing the removable binder to water or an organic solvent.

3. The method of claim 1, wherein the removable binder comprises polyethylene glycol, methoxypolyethylene glycol, polyvinyl alcohol, carboxy methyl cellulose, polyvinyl pyrrolidone, polyacrylic acid, apolyacrylamide, xantham gum, a pectin, a chitosan derivative, dextran, carrageenan, guar gum, a cellulose ether, or a starch based compound.

4. The method of claim 1, wherein the dielectric particles comprise glass, ceramic, polymer, or composite particles.

5. The method of claim 1, wherein the permeable dielectric spacer comprises a contiguous porous dielectric material.

6. The method of claim 1, further comprising removing the electrode and the permeable dielectric spacer from the fused metal surface subsequent to said applying the voltage differential.

7. The method of claim 1, wherein applying the applied electrical voltage includes varying the applied electrical voltage or current.

8. The method of claim 1, wherein the fused metal surface is disposed in an internal chamber of the article.

9. The method of claim 8, further comprising flowing liquid electrolyte through the internal chamber during application of said electrical voltage.

10. The method of claim 9, further comprising removing evolved gas evolved from the internal chamber with flowing liquid electrolyte during application of the voltage differential.

11. The method of claim 9, further comprising varying a flow rate of flowing liquid electrolyte through the internal chamber, or varying the applied electrical voltage or current, or simultaneously varying both the flow rate of flowing liquid electrolyte through the internal chamber and the applied electrical voltage.

12. A method of making a heat exchanger, comprising forming a heat exchanger core comprising a plurality of internal fluid flow passages;

disposing an electrode over an internal metal surface of the internal fluid flow passages, and a permeable dielectric spacer between the internal metal surface and the electrode;

infiltrating a liquid electrolyte into the permeable dielectric spacer;

applying an electrical voltage differential to the electrode and the internal metal surface; and removing the electrode and the permeable dielectric spacer from the internal metal surface subsequent to application of the voltage differential, wherein disposing the electrode and permeable dielectric spacer comprises:

applying a layer comprising dielectric particles and a removable binder on the internal metal surface;

applying the electrode over the layer; and removing the removable binder.

13. The method of claim 12, wherein the permeable dielectric spacer comprises a contiguous porous dielectric material.

14. The method of claim 12, wherein applying the applied electrical voltage includes varying the applied electrical voltage or current.

15. The method of claim 12, further comprising flowing liquid electrolyte the internal fluid flow passages during application of said electrical voltage.

16. The method of claim 14, further comprising removing evolved gas from the internal fluid flow passages with flowing liquid electrolyte during application of the voltage differential.

17. The method of claim 14, further comprising varying a flow rate of flowing liquid electrolyte through the internal fluid flow passages, or varying the applied electrical voltage or current, or simultaneously varying both the flow rate of flowing liquid electrolyte through the internal chamber and the applied electrical voltage.

18. A method of electropolishing a metal surface, comprising:

disposing an electrode over the metal surface, and a permeable dielectric spacer between the metal surface and the electrode;

infiltrating a liquid electrolyte into the permeable dielectric spacer; and applying an electrical voltage differential to the electrode and the metal surface to electropolish the metal surface, wherein disposing the electrode and permeable dielectric spacer comprises:

applying a layer comprising dielectric particles and a removable binder on the metal surface;

applying the electrode over the layer; and removing the removable binder.

19. The method of claim 18, further comprising removing either or both of the electrode and the permeable dielectric spacer from the metal surface.

20. The method of claim 6, further comprising recycling either or both of removed electrode material and the removed dielectric spacer material.

\* \* \* \* \*